(12) United States Patent
Javidi (10) Patent No.: US 6,519,340 B1
(45) Date of Patent: *Feb. 11, 2003

(54) METHOD AND APPARATUS FOR ENCRYPTION USING PARTIAL INFORMATION

(75) Inventor: Bahram Javidi, Storrs, CT (US)

(73) Assignee: The University of Connecticut, Storrs, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/240,541

(22) Filed: Jan. 29, 1999

Related U.S. Application Data (60) Provisional application No. 60/078,254, filed on Mar. 17, 1998.

(51) Int. Cl.[7] .............................. H04K 1/00; H04L 9/00; H04N 7/167
(52) U.S. Cl. .......................... 380/28; 380/219; 380/220
(58) Field of Search ................................ 380/207, 208, 380/219, 220, 28

(56) References Cited

U.S. PATENT DOCUMENTS

| | | | | |
|---|---|---|---|---|
| 3,679,821 | A | * | 7/1972 | Schroeder ....................... 178/6 |
| 4,393,276 | A | | 7/1983 | Steele |
| 4,558,462 | A | | 12/1985 | Horiba et al. .................. 382/42 |
| 5,072,314 | A | | 12/1991 | Chang |
| 5,315,668 | A | | 5/1994 | O'Hair |
| 5,485,312 | A | | 1/1996 | Horner et al. |
| 5,712,912 | A | * | 1/1998 | Tomko et al. ............... 380/256 |
| 5,903,648 | A | * | 5/1999 | Javidi .......................... 380/10 |
| 6,219,794 | B1 | * | 4/2001 | Soutar et al. ................ 713/202 |

OTHER PUBLICATIONS

Introduction to Fourier Optics, Chapter 9 (McGraw–Hill, New York, 1996), J.W. Goodman, pp. 295–341.
Real–Time Optical Information Processing, Academic Press 1994, Bahram–Javidi—Chapter 4—pp. 115–183.
Computer Generated Intergral Photography, Sixth International Workshop On Three–dimensional Imaging Media Technology Seoul Korea pp. 21–28, Sung–Wook Min, Sungyong Jung, Jae–Hyeung Park, and Byoungho Lee.

(List continued on next page.)

*Primary Examiner*—Gilberto Barron
*Assistant Examiner*—Douglas J Meislahn
(74) *Attorney, Agent, or Firm*—Cantor Colburn LLP (57) ABSTRACT

A method and apparatus of encrypting optical images using binarization or phase only information is presented with a number of ways to secure the image also being provided. An image to be encrypted is first multiplied by a random phase function. The Fourier transform of the product of the image and the random phase function is then multiplied by another random phase function in the Fourier (or Fresnel) domain. Taking the inverse Fourier (or Fresnel) transform, an encrypted image in the output plane is obtained. Alternatively, the image to be encrypted can be phase encoded and then encrypted to provide an extra level or security. The image can be secured using one key in the Fourier or Fresnel domain followed by phase extraction. This encrypted image may then binarized, which may include binarizing the phase-only part of the encrypted image. The use of binarization enables ease of implementation and data compression while still providing recovery of images having good quality. The original image may be recovered from the phase-only part of the encrypted image, the binarized encrypted image, or the binarized phase-only part of the encrypted image.

43 Claims, 5 Drawing Sheets

OTHER PUBLICATIONS

Encryted optical storage with wavelength–key and random phase codes—Osamu Matoba and Bahram Javidi, 1999 Optical Society of America—vol. 38.

Encrypted optical memory system using three–dimensional keys in the Fresnel domain, 1999 Optical Society of America, p. 762–764, Jun. 1, 1999, Osamu Matoba and Bahram Javidi.

Three–dimensional object recognition by use of digital holography—Optics Letters, vol. 25, No. 9, May 1, 2000, Bahram Javid and Enrique Tajahuerce, pp. 610–612.

Integral 3D Imaging for Broadcast; 2nd Int. Display Workshop (ITE Tokyo 1995) p. 75–80, F. Okano, H. Hoshino, J. Arai and I. Yuyama.

Three–dimensional Video and Display; Devices and Systems Bahram Javidi and Fumio Okano, Information Technology 2000, Proceedings of the SPIE, vol. CR 76, Boston (entire book).

Integral Three–dimensional Imaging with digital Reconstruction, Journal of Optics Letters, vol. 26, No. 3, Feb. 1, 2001, H. Arimoto and Bahram Javidi, P. 157–159.

"Optical pattern recognition for validation and security verification"; B. Javidi & J. Horner; *Optical Engineering*; Jun., 1994.

"Optical image encryption based on input plane and Fourier plane random encoding"; Ph. Refregier & B. Javidi; *Optics Letters*, vol. 20, No. 7; Apr. 1, 1995.

* cited by examiner

METHOD AND APPARATUS FOR ENCRYPTION USING PARTIAL INFORMATION

CROSS REFERENCE TO RELATED APPLICATIONS

This application claims the benefit of U.S. Provisional Application Ser. No. 60/078,254 filed Mar. 17, 1998.

FIELD OF THE INVENTION

The present invention relates to encryption. More specifically, the present invention relates to a novel method and apparatus of encryption using binarization and phase information of encrypted data in terms of display or transmission of encrypted data.

BACKGROUND OF THE INVENTION

Image data security has recently become an important issue. An image is generally a two-dimensional data. In accordance with which, a one-dimensional signal or two-dimensional image may need encryption in many applications for security reasons. Also, encryption of memory, which may comprise one or more images, can be considered. Furthermore, optical security and encryption methods using random phase encoding have been proposed recently, see generally "Optical pattern recognition for validation and security verification", by B. Javidi and J. L. Homer, Opt. Eng. 33, 1752–1756 (1994). Also see, "Experimental demonstration of the random phase encoding technique for image encryption and security verification", by B. Javidi, G. Zhang and J. Li, Optical Engineering, 35, 2506–2512, 1996; "Fault tolerance properties of a double phase encoding encryption technique", by B. Javidi, A. Sergent, G. Zhang, and L. Guibert, Optical Engineering, 36(4), 992–998, 1997; "Practical image encryption scheme by real-valued data", by Yang, H.-G., and E.-S. Kim, Optical Engineering, 35(9), 2473–2478, 1996; "Random phase encoding for optical security, by Wang, R. K., I. A. Watson, and C. Chatwin", Optical Engineering, 35(9), 2464–2469, 1996; "Optical implementation of image encryption using random phase encoding", by Neto, L. G. Y. Sheng, Optical Engineering, 35(9), 2459–2463, 1996; and "Optical image encryption using input and Fourier plane random phase encoding" by Ph. Refregier and B. Javidi, Optics Letters, Vol. 20, 767–770, 1995.

SUMMARY OF THE INVENTION

The above-discussed and other drawbacks and deficiencies of the prior art are overcome or alleviated by the method and apparatus of encrypting optical images using binarization and phase information. An image to be encrypted is first multiplied by a key, e.g., a random phase function. The Fourier transform of the product of the image and the random phase function is then multiplied by another key, e.g., another random phase function in the Fourier domain. Taking the inverse Fourier transform, an encrypted image in the output plane is obtained. In accordance with the present invention, this encrypted image is then binarized, which may include binarizing the phase-only part of the encrypted image. The use of binarization enables ease of implementation and data compression while still providing recovery of images having good quality. In addition, the phase of the encrypted image only can be use for description, which makes it easier to display the encryption using techniques such as embossing.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Generally, an encryption technique using random phase encoding in both the input plane and the Fourier plane is presented, also see U.S. patent application Ser. No. 08/595,873 entitled Method and Apparatus For Encryption by B. Javidi, filed Feb. 6, 1996, which is incorporated by reference. More specifically, each stored image is encrypted and can be read out by a unique code or a universal code. In accordance with this exemplary method, the image to be encrypted is first multiplied by a random phase function. The Fourier transform of the product of the image and the random phase function is then multiplied by another random phase function in the Fourier domain. Taking the inverse Fourier transform, an encrypted image in the output plane is obtained which is then binarized (see, e.g., "Real-Time Optical Information Processing", by B. Javidi and J. L. Horner, Academic Press, Ch. 4 (1994) and "The Computer In Optical research and Methods"B. R. Frieden ed., Ch. 6, "Computer Generated Holograms", by W. J. Dallas, Springer Verlog, Berlin (1980), which are incorporated herein by reference in their entirety) and stored. The encrypted memory is a stationary white noise if the two encrypting random phase functions are two independent white sequences uniformly distributed on [0, 2π], e.g., see "Optical image encryption based on input plane and Fourier plane random encoding," by Ph. Refregier and B. Javidi, Opt. Lett., 20(7), (1995), which is incorporated herein by reference in its entirety. This makes it very difficult to decrypt the memory without the knowledge of the phase functions used in the encryption, see "Optical image encryption based on input plane and Fourier plane random encoding," by Ph. Refregier and B. Javidi, Opt. Lett., 20(7), (1995), Probability, Random Variable, and Stochastic Processes, by A. Papoulis, 2nd edition, McGraw-Hill, New York (1984) and "Performance of a double phase encoding, encryption technique using binarized encrypted images" by B. Javidi, A. Sergant and E. Ahouzi, Optical Engineering, Vol. 37, No. 2, 565–569, (1998) which are incorporated herein by reference in their entirety.

By way of example, f(x) denotes optical image to be stored in the memory of a computer. n(x) and b(α) denote two independent white sequences uniformly distributed on [0, 1], respectively. Herein x is a coordinate of the space domain, and α is a coordinate of the Fourier domain. In the encryption process, the key, e.g., the random phase function exp[j2πn(x)] is used in the space domain and the other key, e.g., the random phase function exp[j2πb(α)] is used in the Fourier domain. The encrypted memory can be represented as:

$$\phi(x) = \{f(x)\exp[j2\pi n(x)]\} * \mu(x) \quad \text{Equation 1}$$

where $\mu(x)$ is the inverse Fourier transform of exp[j2πb(α)], and * denotes the convolution operation. In accordance with the present invention, the data image can only be decrypted when a corresponding key, i.e., exp[−j2πb(α)], is used for the decryption. It will be appreciated that Equation 1 is for a single encrypted signal, whereby a summation of a plurality of such signals would constitute an encrypted memory. Further, while the random phase function is described herein as a generally uniformly distributed white sequence, it is within the scope of the present invention that it is any random distribution, statistical distribution or other unknown distributions.

To decrypt the memory, the Fourier transform of the encrypted memory φ (x) is multiplied by the decoding mask exp[−j2πb(α)]. This causes the encoding phase function exp[j2πb(α)] to be canceled out by the decoding mask exp[−j2πn(α)] that serves as the key for decryption. The decoded image is then inverse Fourier transformed to the space domain. Therefore, the original data image f(x) can be recovered in the space domain. If the stored image is positive, the phase function exp[j2πn(x)] is removed by an intensity sensitive device, such as a video camera. More specifically, |f(x)|² is obtained, when f(x) has a positive pixel value, knowing |f(x)|² is equivalent to knowing f(x) whereby the original data image is obtained, as is readily apparent to one of ordinary skill in the art. Alternatively, the decoded image in the space domain is multiplied by a complex conjugate of the original mask, i.e., exp[−j2πn(x)], which will provide the original data image f(x). This alternative is required when f(x) is not positive or real. It will be appreciated that the images not decrypted remain stationary white background noise. Further, while a Fourier transform is described herein it is within the scope of the present invention that a Fresnel transform may be employed. Moreover, when the transformer is unknown, it may also serve as a key.

Since the encrypted image described above is complex, both the amplitude and the phase of the information need to be displayed. Such can be avoided by using holograms. However, for real-time information processing it is preferred that spatial light modulators be used, although simultaneous control of phase and amplitude is difficult. In view of this difficulty, partial information of the encrypted image is used herein for further optical processing. More specifically, the amplitude or the phase information of the encrypted image are used. The phase-only information $\phi_\psi(x)$ of the encrypted image is expressed as:

$$\varphi_\psi(x) = \frac{\varphi(x)}{|\varphi(x)|} \quad \text{Equation 2}$$

where φ(x) is the encrypted image. The amplitude-only information $\phi_A(x)$ of the encrypted image is expressed as:

$$\phi_A(x) = |\phi(x)| \quad \text{Equation 3}$$

Figure 1A:
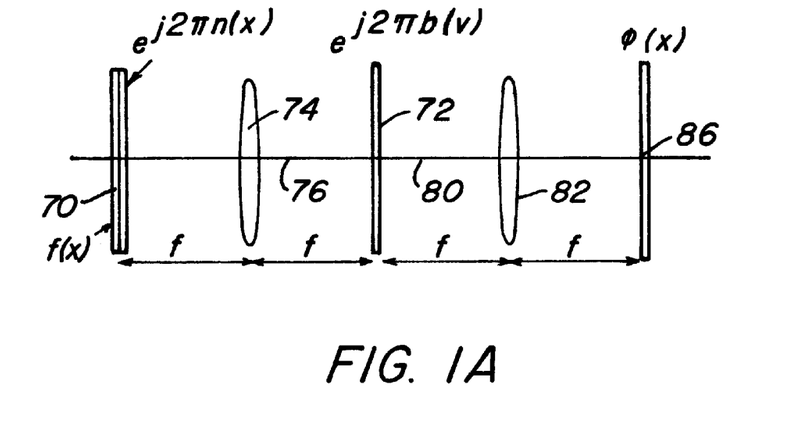
FIG. 1A is a schematic diagram of an optical assembly for use in the encryption technique of the present invention.
Figure 1B:
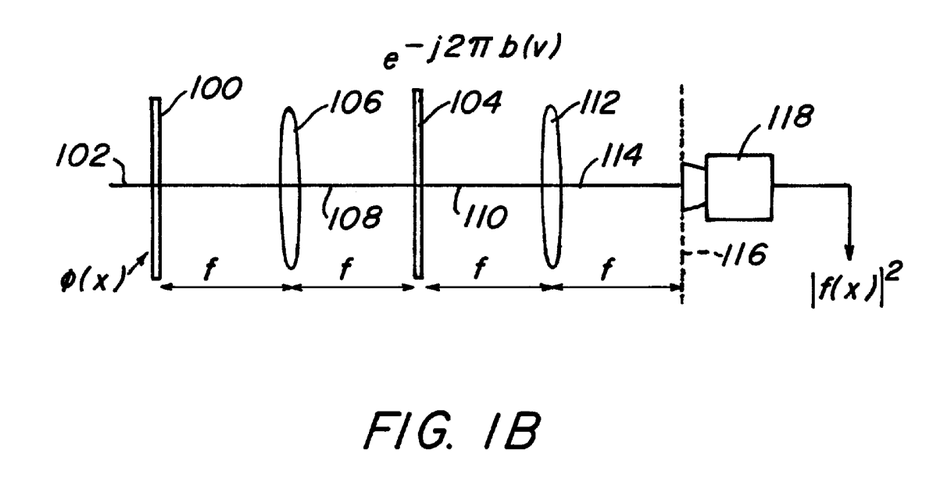
FIG. 1B is a schematic diagram of an optical assembly for use in the decryption technique of the present invention.

Referring to FIGS. 1A and B, an example of an optical assembly for use in the encryption (FIG. 1A) and decryption (FIG. 1B) technique with one dimensional functions is generally shown. In the memory recording process, the data image f(x) to be encrypted is placed at an input plane 70 and a random phase mask having a one dimensional function, i.e., exp[j2πn(x)], is attached to it. A Fourier transform of the product of the image and the random phase function is obtained at a Fourier plane 72 by a Fourier transform lens 74, i.e., a beam 76. The Fourier transform of this product (beam 76) is multiplied by another random phase mask having a one dimensional function, i.e., exp[j2πb(v)], which is placed at plane 72, resulting in a beam 80. Taking another Fourier transform of beam 80 by a Fourier transform lens 82, the encrypted image data φ(x) is obtained at a plane 86. An optical recording media is placed at plane 86, whereby a holographic optical memory is obtained.

To decrypt the memory φ(x), a key, which is complex conjugate of the white random sequence for the encryption, is needed. The encrypted memory is placed at an input plane 100, FIG. 1B, and is within the path a generally coherent light beam 102. A Fourier transform of the encrypted image φ(x) is obtained at a plane 104 by a Fourier transform lens 106, i.e., a beam 108, where it is multiplied by a decoding phase mask having a one dimensional function, i.e., exp[−j2πb(v)], that is the complex conjugate of the function of random coding phase mask, i.e., exp[j2πb(v)], resulting in a beam 110. Taking another Fourier transform of beam 110 by a Fourier transform lens 112, the original (decrypted) image data (beam 114) is obtained at an output plane 116 by detector (e.g., a one dimensional CCD camera or array) 118, whereby the first random phase modulation, i.e., exp[j2πn (x)], is removed, as described hereinabove. It will be appreciated that without this key, the encrypted image can not be recovered. Further, the encryption process of the present invention can be done optically, as described above, or electronically. This process of encryption and decryption being more fully described in co-pending, parent, U.S. patent application Ser. No. 08/595,893, entitled Method and Apparatus For Encryption, filed Feb. 6, 1996, which is incorporated herein by reference in its entirety.

Figure 2A:
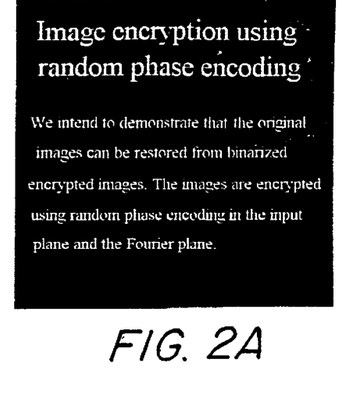
FIG. 2A is an original binary text image.
Figure 2B:
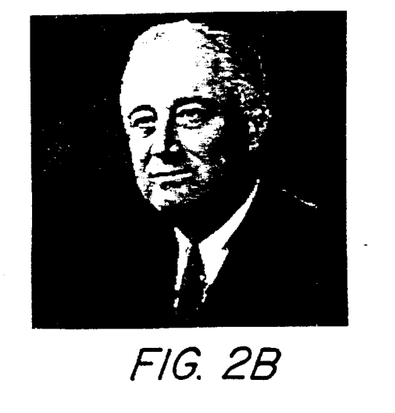
FIG. 2B is an original grayscale face image.
Figure 2C:
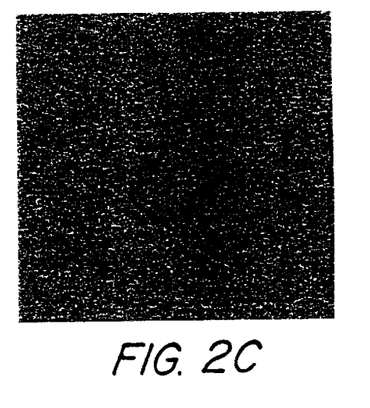
FIG. 2C is a recovered text image from amplitude-only information of an encrypted image of the image of FIG. 2A.
Figure 2D:
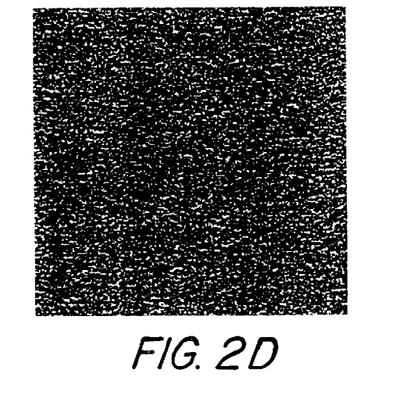
FIG. 2D is a recovered face image from amplitude-only information of an encrypted image of the image of FIG. 2B.
Figure 2E:
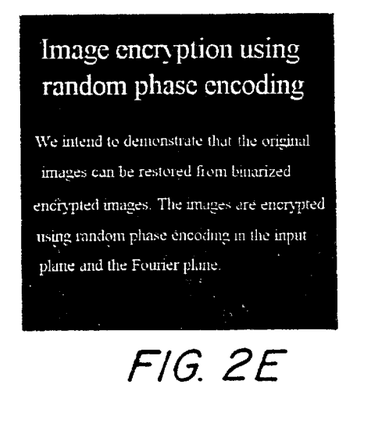
FIG. 2E is a recovered text image from phase-only information of the encrypted image of the image of FIG. 2A.
Figure 2F:
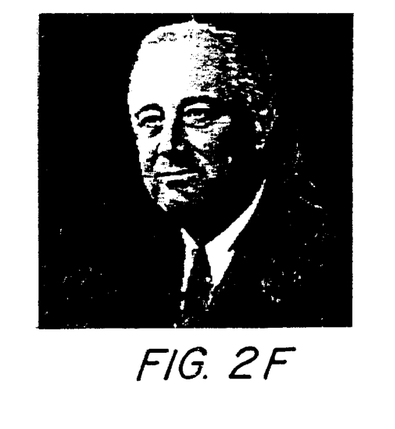
FIG. 2F is a recovered face image from phase-only information of the encrypted image of FIG. 2B.

Referring now to FIGS. 2A and 2B, a binary image of a text (FIG. 2A) and a facial image which is a 256 levels gray scale image (FIG. 2B) are shown. These images are 512×512 pixels. In this example, the images of FIGS. 2A and 2B have been encrypted using two independent white sequences, as described above in EQUATION 1. Attempted recovery (decryption) of the images using amplitude-only information is shown in FIGS. 2C and 2D, wherein it is clearly shown that the original images were not recovered from the amplitude-only information. Recovery (decryption) of the images using phase-only information is shown in FIGS. 2E and 2F, wherein it is clearly shown that good quality images of the original images were recovered.

In evaluating the quality of these recovered images, the decrypted images (FIGS. 2E and 2F) are compared with their original images (FIGS. 2A and 2B). Since any image sensor such as a CCD camera measures the intensity of the output, the final output is measured by the absolute value of the image |f(x)|, where f'(x) is the decrypted image. Thus, the error Er is defined as a metric to compare a decrypted image with an original input image:

$$Er = E_x\{|f'(x)| - f(x)\}^2 \qquad \text{Equation 4}$$

$$= \frac{1}{N}\sum (|f'(x)| - f(x))^2$$

where f(x) is the original image, N is the number of pixels of the original image, and $E_x\{|f(x)|-f(x)\}$ is the spatial averaging over the entire image. The error Er, as calculated from EQUATION 4, in this example is 0.004 for the text image (FIG. 2E) and 0.0003 for the face image (FIG. 2F). In view of the foregoing, it appears that the phase information of the encrypted image is the critical data to be used for decryption. Further, as described above, the phase-only information can easily be implemented in an optical system.

In accordance with the present invention, binarization of the encrypted image is introduced to further improve the encryption process. The encrypted image is binarized (see, Jain, A., "Fundamentals of Digital Image Processing" Prentice-Hall, 1989 and Pratt, W., "Digital Image Processing", Wiley, 1991, both of which are incorporated by reference in their entirety) since the optical implementation of a binary image is much easier than the implementation of a complex image.

Figure 3A:
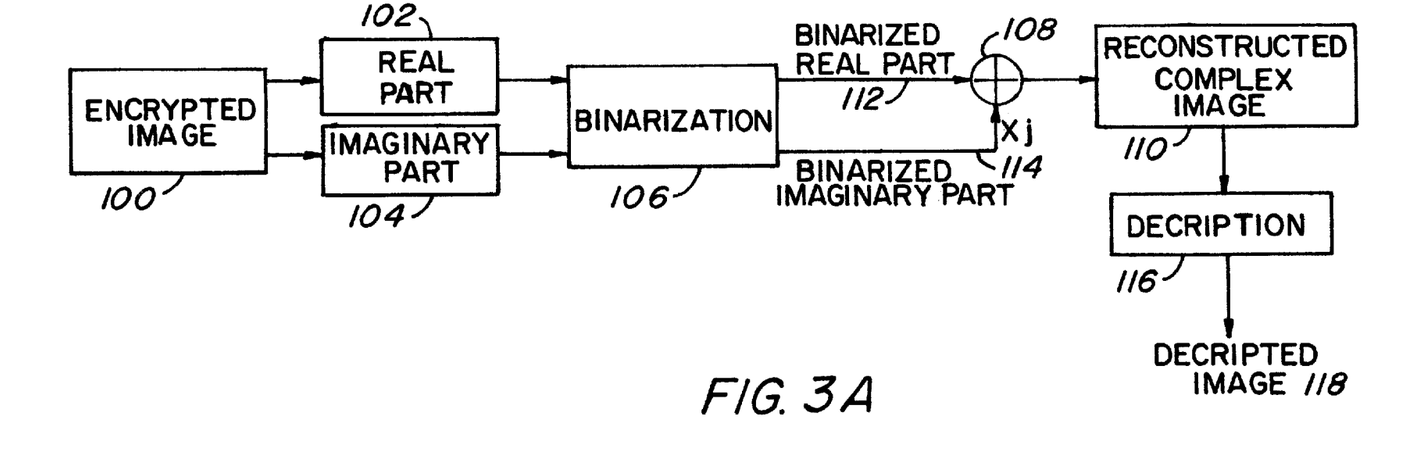
FIG. 3A is a block diagram of the decryption process from the binarized reconstructed complex image in accordance with the present invention.

Referring now to FIG. 3A, the encrypted image φ(x) 100 can be expressed in terms of a real part 102 and an imaginary part 104 as:

$$\phi(x)=\phi_R(x)+j\phi_I(x), \qquad \text{Equation 5}$$

where $\phi_R(x)$ is the real part of φ(x) and $\phi_I(x)$ is the imaginary part of φ(x). In a first embodiment the real part and the imaginary part of the encrypted image are binarized 106 and then combined 108 to form a complex image $\bar{\phi}(x)$ 110, where $\bar{\phi}(x)$ denotes a binarized version of φ(x), with a binary real part 112 and a binary imaginary part 114 as follows:

$$\bar{\phi}(x)=\bar{\phi}_R(x)+j\bar{\phi}_I(x), \qquad \text{Equation 6}$$

where $$\overline{\varphi_R}(x) = \begin{cases} 1 & \text{if } \text{Re}\,[\varphi(x)] > \text{Median}\{\text{Re}\,[\varphi(x)]\} \\ -1 & \text{if } \text{Re}\,[\varphi(x)] < \text{Median}\{\text{Re}\,[\varphi(x)]\} \end{cases}$$

$$\overline{\varphi_I}(x) = \begin{cases} 1 & \text{if } \text{Im}\,[\varphi(x)] > \text{Median}\{\text{Im}\,[\varphi(x)]\} \\ -1 & \text{if } \text{Im}\,[\varphi(x)] < \text{Median}\{\text{Im}\,[\varphi(x)]\} \end{cases}$$

Figure 4A:
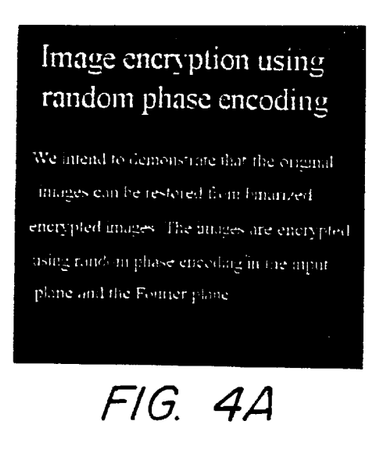
FIG. 4A is an imaged decrypted from binarized reconstructed complex image of the image of FIG. 2A in accordance with the present invention.
Figure 4B:
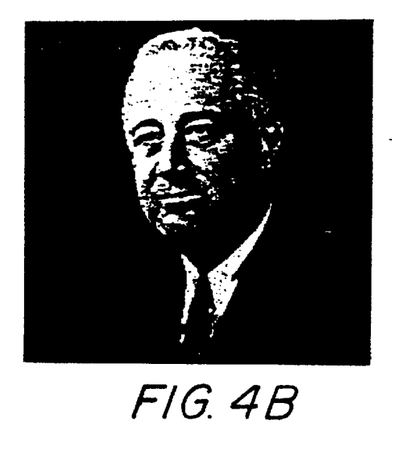
FIG. 4B is an image decrypted from binarized reconstructed complex image of the image of FIG. 2B in accordance with the present invention.

$\bar{\phi}(x)$, defined in EQUATION 6, is referred to as the reconstructed complex image 110. This complex image 110 is then decrypted 116, as described above, to provide a decrypted image 118. Examples of the decryption of binarized encrypted images in accordance with FIG. 3A are shown in FIGS. 4A and B (of original images shown in FIGS. 2A and B, respectively). The error Er, as calculated from EQUATION 4, in this example was 0.009 for the text image (FIG. 4A) and 0.001 for the face image (FIG. 4B). Accordingly, good quality images were obtained for these images.

Figure 3B:
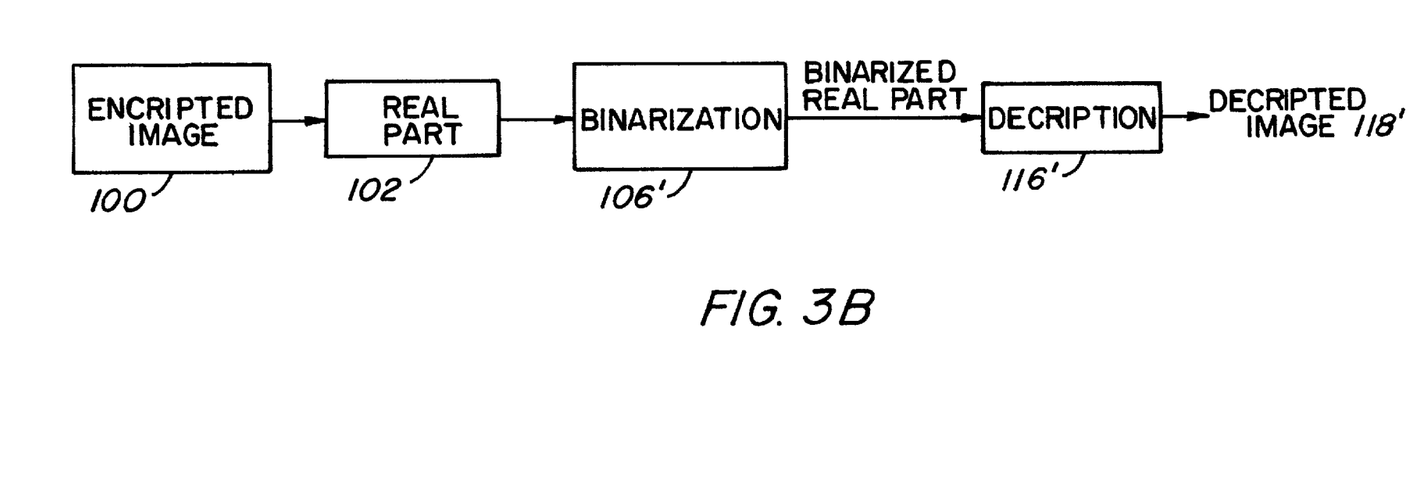
FIG. 3B is a block diagram of the decryption process from the binarized phase-only information of the encrypted image in accordance with the present invention.

Referring now to FIG. 3B, the encrypted image φ(x) can also be expressed in polar form as:

$$\phi(x)=\phi_A(x)\phi_\psi(x), \qquad \text{Equation 7}$$

where $\phi_\psi(x)$ is the phase part of φ(x) and $\phi_A(x)$ is the amplitude part of φ(x), as defined in EQUATIONS 2 and 3, respectively. The binary phase encrypted image can be expressed as:

$$\overline{\varphi_\psi}(x) = \begin{cases} 1 & \text{if } \text{Re}\,[\varphi(x)] \geq 0 \\ -1 & \text{if } \text{Re}\,[\varphi(x)] < 0 \end{cases} \qquad \text{Equation 8}$$

Figure 5A:
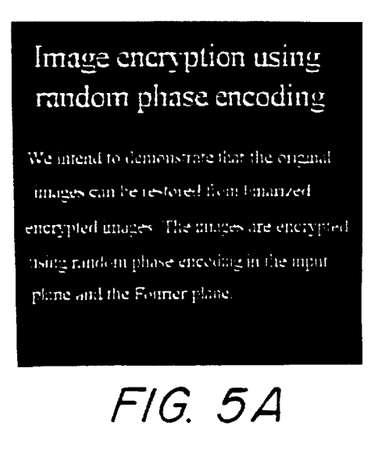
FIG. 5A is an image decrypted from the binarized phase-only information of the decrypted image of the image of FIG. 2A in accordance with the present invention.
Figure 5B:
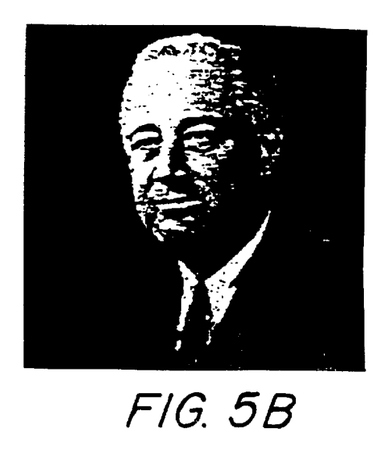
FIG. 5B is an image decrypted from the binarized phase-only information of the decrypted image of the image of FIG. 2B in accordance with the present invention.

Accordingly, only the real part of the encrypted image is binarized 106' providing the binary phase encrypted image $\bar{\phi}_\psi(x)$, as defined in EQUATION 8. This binary phase encrypted image is then decrypted 116', as described above, to provide a decrypted image 118'. Examples of the decryption of binarized encrypted images in accordance with FIG. 3B are shown in FIGS. 5A and B (of original images shown in FIGS. 2A and B, respectively). The error Er, as calculated from EQUATION 4, in this example was 0.02 for the text image (FIG. 5A) and 0.002 for the face image (FIG. 5B). It is apparent from the FIGURES that the recovered images obtained using the binarized phase information of the encrypted image are of lesser quality than the images decrypted from the reconstructed complex image. However, this phase-only embodiment uses less information and is easier to implement using spatial light modulators, other displays, or recording media such as printing the binary or phase only encrypted data.

The quality of these recovered images can be improved by further processing, either optically or digitally. By way of example, an image is further processed by filtering, such as a lowpass filter and/or a spatial averaging filter (see generally, Li H.-Y., Y. Qiao, and D. Psaltis, "Optical network for real-time face recognition", Applied Optics, 32, 5026–5035, 1993 and Jain, A., "Image Enhancement" (p. 244), in Fundamentals of Digital Image Processing, Eds., Prentice-Hall, 1989, both of which are incorporated herein by reference in their entirety).

Figure 6A:
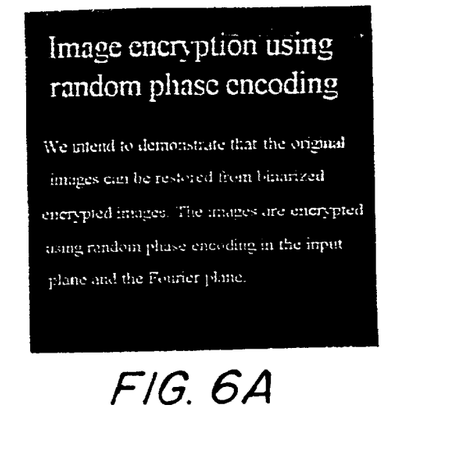
FIG. 6A is an image decrypted from binarized phase information of the encrypted image of the image of FIG. 2A which has been further processed using a lowpass filter.
Figure 6B:
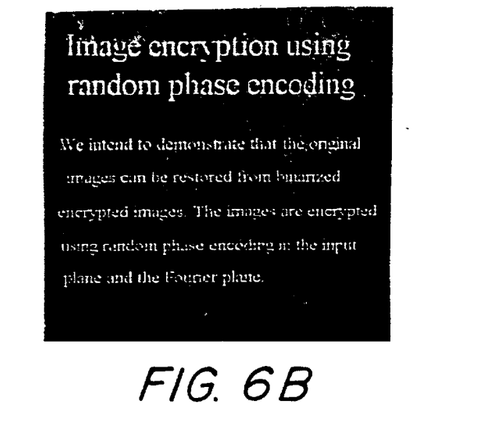
FIG. 6B is an image decrypted from binarized reconstructed complex image information of the image of FIG. 2A using a lowpass filter.
Figure 6C:
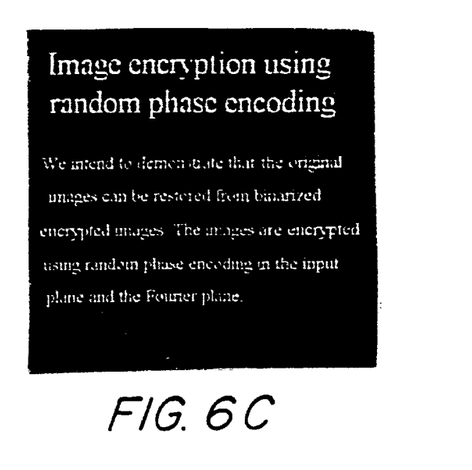
FIG. 6C is an image decrypted from binarized phase information of the encrypted image of the image of FIG. 2A which has been further processed using a spatial averaging filter of length 3×3 pixels.
Figure 6D:
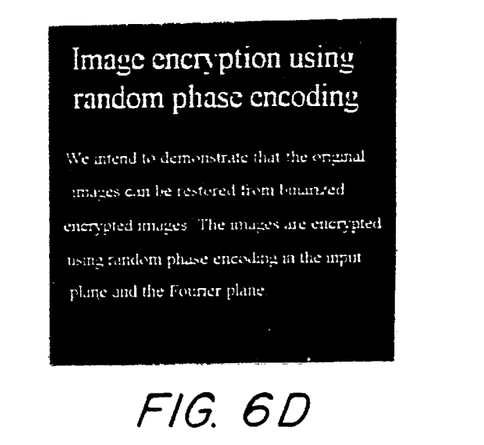
FIG. 6D is an image decrypted from binarized reconstructed complex image information of the image of FIG. 2A which has been further processed using a spatial averaging filter of length 3×3 pixels.

FIGS. 6A and B show decrypted images of the original image of FIG. 2A which were obtained using a lowpass filter of bandwidth (N/2)×(N/2) pixels, applied to the decryption of a binarized phase-only image, as described above (EQUATION 8), and a binarized reconstructed complex image, as described above (EQUATION 6), respectively. The error Er, as calculated from EQUATION 4, was 0.06 for the binarized phase-only image (FIG. 6A) and 0.06 for the binarized reconstructed complex image (FIG. 6B). The edges of the characters in these images are blurred due to the removal of the high frequencies of the image. FIGS. 6C and D show decrypted images of the original image of FIG. 2A which were obtained using a spatial averaging filter of length 3×3 pixels for the binarized phase-only image, as described above (EQUATION 8), and the binarized reconstructed complex image, as described above (EQUATION 6), respectively. The error Er, as calculated from EQUATION 4, was 0.04 for the binarized phase-only image (FIG. 6C) and 0.02 for the binarized reconstructed complex image (FIG. 6D). Spatial averaging filtering removes noise more efficiently, but it introduces more blur than lowpass filtering.

The same processing was applied to the original image of FIG. 2B. The error Er, as calculated from EQUATION 4, with lowpass filtering was 0.009 for the binarized phase-only image and 0.007 for the binarized reconstructed complex image. The error Er, as calculated from EQUATION 4, with spatial averaging filtering (3×3 pixels) was 0.008 for the binarized phase-only image and 0.005 for the binarized reconstructed complex image. The spatial averaging filter removes more noise and gives better results than the ideal lowpass filtering. Spatial averaging filtering is better adapted to the processing of gray scale facial images since the human vision can easily recognize a lightly blurred image (as opposed to text).

While the above described embodiments provide examples of encryption/decryption of a specific type of information, it is within the scope of the present invention that such information includes optical images, digitized images, one-dimensional data, two-dimensional data, multi-dimensional data (e.g., color, wavelength) electrical signals or optical signals. Further, while the above described embodiments provide examples of encryption/decryption of a single image, it is within the scope of the present invention that each of the systems described herein is equally applicable to a plurality of images.

While this example is illustrated optically such can easily be accomplished electronically as is readily apparent to one of ordinary skill in the art. Further, while a one dimensional application has been described two dimensional applications are within the scope of the present invention, such as described in U.S. patent application Ser. No. 08/595,873.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of encryption and decryption comprising the steps of:
   encrypting original information to generate encrypted information, said encrypting said original information comprises,
   (1) multiplying said original information by a first key to generate a first product of said original information and said first key in a first domain,
   (2) transforming said first product from said first domain into a second domain to generate a first transformed product in said second domain,
   (3) multiplying said first transformed product by a second key in said second domain to generate a second product,
   (4) transforming said second product from said second domain to a third domain to generate encrypted information;
   binarizing at least a part of said encrypted information to generate binarized encrypted information; and
   decrypting said binarized encrypted information to provided decrypted information indicative of said original information, said decrypting said binarized encrypted information comprises,
   (1) transforming said binarized encrypted information from said third domain to a fourth domain to generate a transformed encrypted information,
   (2) multiplying said transformed encrypted information by a third key in said fourth domain to generate a third product, said third key being a conjugate of said second key wherein said second key is removed from said encrypted information,
   (3) transforming said third product from said fourth domain to a fifth domain to generate a second transformed product in said fifth domain, and
   (4) removing said first key from said second transformed product to provided said decrypted information.

2. The method of claim 1 wherein said original information comprises an optical image, a digitized image, one dimensional data, two dimensional data, multi-dimensional data, an electrical signal or an optical signal.

3. The method of claim 2 wherein said optical image, digitized image, one dimensional data, two dimensional data, multi-dimensional data, electrical signal or optical signal comprises a plurality thereof.

4. The method of claim 1 wherein said binarizing at least said part of said encrypted information comprises binarizing at least one of a real part and an imaginary part of said encrypted information.

5. The method of claim 1 wherein said binarizing at least said part of said encrypted information comprises binarizing a phase part of said encrypted information.

6. The method of claim 1 wherein:
   said encrypting said original information further comprises phase encoding said original information prior to said step (1) of said step of encrypting; and
   said decrypting said binarized encrypted information further comprises removing said phase encoding from said encrypted information to provided said decrypted information.

7. The method of claim 1 wherein said removing said first key comprises:
   multiplying said second transformed product by a fourth key in said fifth domain to generate said decrypted information, said fourth key being a conjugate of said first key wherein said first key is removed from said encrypted information.

8. The method of claim 1 wherein said removing said first key comprises:
   removing said first key with an intensity sensitive device.

9. The method of claim 1 wherein said transforming steps each comprise Fourier or Fresnel transforming.

10. The method of claim 1 wherein said first and second keys each comprise a random phase function.

11. The method of claim 1 wherein said first and second keys each comprise a complex amplitude and phase function.

12. The method of claim 10 wherein said random phase functions comprise generally uniformly distributed white sequences, random distributions, statistical distributions or unknown distributions.

13. The method of claim 1 wherein said first and second functions each comprise a one dimensional function.

14. The method of claim 1 wherein said first and second functions each comprise a two dimensional function.

15. The method of claim 1 wherein said first, third and fifth domains are a space domain and said second and fourth domains are a Fourier domain or a Fresnel domain.

16. A method of encryption and decryption comprising the steps of:
  encrypting original information to generate encrypted information, said encrypting said original information comprises,
    (1) transforming said original information from a first domain into a second domain to generate a transformed original information in said second domain,
    (2) multiplying said transformed original information by a first key in said second domain to generate a first product,
    (3) transforming said first product from said second domain to a third domain to generate said encrypted information;
  binarizing at least a part of said encrypted information to generate binarized encrypted information; and
  decrypting said binarized encrypted information to provided decrypted information indicative of said original information, said decrypting said binarized encrypted information comprises,
    (1) transforming said binarized encrypted information from said third domain to a fourth domain to generate a transformed encrypted information,
    (2) multiplying said transformed encrypted information by a second key in said fourth domain to generate a second product, said second key being a conjugate of said first key wherein said first key is removed from said encrypted information, and
    (3) transforming said second product from said fourth domain to a fifth domain to provided said decrypted information.

17. The method of claim 16 wherein said first, third and fifth domains are a space domain and said second and fourth domains are a Fourier domain or a Fresnel domain.

18. The method of claim 16 wherein said binarizing at least said part of said encrypted information comprises binarizing at least one of a real part and an imaginary part of said encrypted information.

19. The method of claim 16 wherein said binarizing at least said part of said encrypted information comprises binarizing a phase part of said encrypted information.

20. A method of encryption and decryption comprising the steps of:
  encrypting original information to generate encrypted information, said encrypting said original information comprises,
    (1) jointly transforming said original information and a first key to generate a first joint power spectrum thereof, and
    (2) transforming said first joint power spectrum to generate said encrypted information which is indicative of a correlation between said original information and said first key;
  binarizing at least a part of said encrypted information to generate binarized encrypted information; and
  decrypting said binarized encrypted information to provided decrypted information indicative of said original information, said decrypting said binarized encrypted information comprises,
    (1) jointly transforming said binarized encrypted information and a second key to generate a second joint power spectrum, said second key being a conjugate of said first key, and
    (2) transforming said second joint power spectrum to provide said decrypted information indicative of a correlation between said encrypted information and said second key.

21. The method of claim 20 wherein said binarizing at least said part of said encrypted information comprises binarizing at least one of a real part and an imaginary part of said encrypted information.

22. The method of claim 20 wherein said binarizing at least said part of said encrypted information comprises binarizing a phase part of said encrypted information.

23. A method of encryption and decryption comprising the steps of:
  encrypting original information to generate encrypted information, said encrypting said original information comprises,
    (1) multiplying said original information by a fist key to generate a first product of said original information and said first key,
    (2) jointly transforming said first product and a second key to generate a first joint power spectrum thereof, and
    (3) transforming said first joint power spectrum to generate said encrypted information which is indicative of a correlation between said first product and said second key;
  binarizing at least a part of said encrypted information to generate binarized encrypted information; and
  decrypting said binarized encrypted information to provided decrypted information indicative of said original information, said decrypting said binarized encrypted information comprises,
    (1) jointly transforming said binarized encrypted information and a third key to generate a second joint power spectrum, said second key being a conjugate of said second key,
    (2) transforming said second joint power spectrum to provide a transformed product indicative of a correlation between said encrypted information and said third key, and
    (3) multiplying said transformed product by a fourth key to generate said decrypted information, said fourth key being a conjugate of said first key wherein said first key is removed from said encrypted information.

24. The method of claim 23 wherein said binarizing at least said part of said encrypted information comprises binarizing at least one of a real part and an imaginary part of said encrypted information.

25. The method of claim 23 wherein said binarizing at least said part of said encrypted information comprises binarizing a phase part of said encrypted information.

26. A method of encryption and decryption comprising the steps of:
  encrypting original information to generate encrypted information; and
  decrypting using only a phase part of said encrypted information to provide decrypted information indicative of said original information.

27. The method of claim 26 wherein:
  said encrypting said original information comprises,
    (1) multiplying said original information by a first key to generate a first product of said original information and said first key in a first domain, (2) transforming said first product from said first domain into a second domain to generate a first transformed product in said second domain,
(3) multiplying said first transformed product by a second key in said second domain to generate a second product,
(4) transforming said second product from said second domain to a third domain to generate encrypted information; and said decrypting said phase part of said encrypted information comprises,
(1) transforming said phase part of said encrypted information from said third domain to a fourth domain to generate a transformed encrypted information,
(2) multiplying said transformed encrypted information by a third key in said fourth domain to generate a third product, said third key being a conjugate of said second key wherein said second key is removed from said encrypted information,
(3) transforming said third product from said fourth domain to a fifth domain to generate a second transformed product in said fifth domain, and
(4) removing said first key from said second transformed product to provide said decrypted information.

28. The method of claim 27 wherein:
said encrypting said original information further comprises phase encoding said original information prior to said step (1) of said step of encrypting; and
said decrypting said phase part of said encrypted information further comprises removing said phase encoding from said encrypted information to provide said decrypted information.

29. The method of claim 27 wherein said removing said first key comprises:
multiplying said second transformed product by a fourth key in said fifth domain to generate said decrypted information, said fourth key being a conjugate of said first key wherein said first key is removed from said encrypted information.

30. The method of claim 27 wherein said removing said first key comprises:
removing said first key with an intensity sensitive device.

31. The method of claim 27 wherein said transforming steps each comprise Fourier or Fresnel transforming.

32. The method of claim 27 wherein said first and second keys each comprise a random phase function.

33. The method of claim 32 wherein said random phase functions comprise generally uniformly distributed white sequences, random distributions, statistical distributions or unknown distributions.

34. The method of claim 27 wherein said first and second functions each comprise a one dimensional function.

35. The method of claim 27 wherein said first and second functions each comprise a two dimensional function.

36. The method of claim 27 wherein said first, third and fifth domains are space domain and said second and fourth domains are a Fourier domain or a Fresnel domain.

37. The method of claim 26 wherein said original information comprises an optical image, a digitized image, one dimensional data, two dimensional data, multi dimensional data, an electrical signal or an optical signal.

38. The method of claim 37 wherein said optical image, digitized image, one dimensional data, two dimensional data, multi dimensional data, electrical signal or optical signal comprises a plurality thereof.

39. The method of claim 26 wherein:
said encrypting said original information comprises,
(1) transforming said original information from a first domain into a second domain to generate a transformed original information in said second domain,
(2) multiplying said transformed original information by a first key in said second domain to generate a first product,
(3) transforming said first product from said second domain to a third domain to generate said encrypted information; and said decrypting said phase part of said encryted information comprises,
(1) transforming said phase part of said encrypted information from said third domain to a fourth domain to generate a transformed encrypted information,
(2) multiplying said transformed encrypted information by a second key in said fourth domain to generate a second product, said second key being a conjugate of said first key wherein said first key is removed from said encrypted information, and
(3) transforming said second product from said fourth domain to a fifth domain to provide said decrypted information.

40. The method of claim 39 wherein said first, third and fifth domains are a space domain and said second and fourth domains are a Fourier domain or a Fresnel domain.

41. The method of claim 26 wherein:
said encrypting said original information comprises,
(1) jointly transforming said original information and a first key to generate a first joint power spectrum thereof, and
(2) transforming said first joint power spectrum to generate said encrypted information which is indicative of a correlation between said original information and said first key; and said decrypting said phase part of said encrypted information comprises,
(1) jointly transforming said phase part of said encrypted information and a second key to generate a second joint power spectrum, said second key being a conjugate of said first key, and
(2) transforming said second joint power spectrum to provide said decrypted information indicative of a correlation between said encrypted information and said second key.

42. The method of claim 26 wherein:
said encrypting said original information comprises,
(1) multiplying said original information by a fist key to generate a first product of said original information and said first key,
(2) jointly transforming said first product and a second key to generate a first joint power spectrum thereof, and
(3) transforming said first joint power spectrum to generate said encrypted information which is indicative of a correlation between said first product and said second key; and said decrypting said phase part of said encrypted information comprises,
(1) jointly transforming said phase part of said encrypted information and a third key to generate a second joint power spectrum, said second key being a conjugate of said second key,
(2) transforming said second joint power spectrum to provide a transformed product indicative of a correlation between said encrypted information and said third key, and
(3) multiplying said transformed product by a fourth key to generate said decrypted information, said fourth key being a conjugate of said first key wherein said first key is removed from said encrypted information.

43. The method of claim 39 wherein:

said encrypting said original information further comprises phase encoding said original information prior to said step (1) of said step of encrypting; and said decrypting said phase part of said encrypted information further comprises removing said phase encoding from said encrypted information to provide said decrypted information.

\* \* \* \* \*